Patented Aug. 25, 1936

2,051,840

UNITED STATES PATENT OFFICE 2,051,840

TREE SURGERY

Howard L. Gerhart, Whiting, Ind., assignor to Standard Oil Company, Chicago, Ill., a corporation of Indiana No Drawing. Application October 31, 1935,
Serial No. 47,629

11 Claims. (Cl. 47—8)

This invention relates to the art of tree surgery and more particularly to a step in that art, which step has to do with sealing excoriated arboraceous tissues. My invention also relates to compositions of matter, commonly known as grafting waxes, for this purpose.

It is an object of my invention to provide superior means and methods for the sealing of excoriated arboraceous tissues. Other and more detailed objects of my invention will become apparent as the description thereof proceeds.

The term "tree surgery" as used in this specification and in the appended claims includes the pruning of trees as well as vines, bushes and other plants having some general histological similarity to trees. It also includes the art of grafting in all its various forms and includes any other operations upon trees or the like which produce excoriated arboraceous tissues which it is desirable to seal.

In pruning trees or the like it is desirable to seal off the excoriated arboraceous tissues in order to keep them moist (by preventing evaporation) and in order to prevent "bleeding", injury by insects and fungi, etc. Similarly, in grafting, regardless of what particular method of juxtaposing the scion and the stock is used, it is desirable to seal the wounded tissues from the atmosphere, prevent evaporation and bleeding, prevent entry of extraneous matter into the wound, prevent attack by insects and fungi, etc. Various compositions of matter usually known as grafting waxes have been used for these purposes.

I have discovered that new and improved compositions of matter for these purposes can be produced using certain biologically inert, highly adhesive, flexible, highly plastic, synthetic hydrocarbon substances, which I refer to as "viscoresins".

It has been found that when certain olefinic hydrocarbons are polymerized under appropriate conditions, substances having very unusual properties are produced. These products are viscous, plastic, resinous solids of an extremely "tacky" and sticky nature and have very high average molecular weights, usually within the range from 1,000 to 12,000 and preferably from 1,500 to 8,000. They are essentially hydrocarbon in chemical composition and are practically saturated. It is, however, quite possible that in molecules of the extreme size of those here involved one or more atoms other than carbon and hydrogen may be present and one or more olefinic linkages may be present. This does not detract from the fact that these viscoresins are essentially saturated hydrocarbons in chemical composition. This is important for the purposes of my invention since saturated hydrocarbons are usually biologically inert.

Resinous substances of the type described in the last paragraph can be produced in various ways from various materials by processes of polymerization, condensation, and/or hydrogenation.

The preferred viscoresin is made by the polymerization of isobutylene with aluminum chloride or preferably boron trifluoride. In making this resin it is desirable to carry out the polymerization at a low temperature, for instance from 0° F. to −100° F. or even lower. The polymerization reaction may be carried out in the presence of a solvent such as naphtha, hexane, pentane, butane or propane, if desired.

Numerous other unsaturated hydrocarbons can be polymerized to make viscoresins suitable for my purpose. Among these may be mentioned isohexene, cyclo-hexene, trimethyl ethylene, isoamylene (particularly isopropylethylene) and other mono-olefins. Branched chain, and particularly iso, mono-olefins are preferred. Viscoresins can also be made from diolefins such as butadiene etc. but these do not usually produce the best resins for my purpose. Acetylene hydrocarbons can also be polymerized to produce resins. If the resins produced by polymerization are not substantially saturated it is preferred to follow the polymerization step with a hydrogenation step in order to produce a substantially saturated resin. Thus, for example, in the case of resins produced from butadiene or from a substituted acetylene the hydrogenation step is highly desirable.

The starting material, catalysts, and polymerization conditions for the production of a viscoresin having certain desired properties can readily be determined by experiment. One preferred method is to treat isobutylene at a temperature of −40° F., with about 0.1% to 2.0% by weight of boron trifluoride. Thus, the isobutylene which is liquid at −40° F. can be held in a vessel surrounded by a refrigerating bath and boron trifluoride gas can be led in with constant stirring until the desired plastic, viscous resin is produced. The reaction under these conditions produces a resin having a degree of plasticity which is usually highly desirable in connection with my invention. The resin thus produced may be purified by washing with a 10% to 20% aqueous solution of sodium hydroxide and then with water.

The hardness of the viscoresins produced can be controlled to a considerable extent by proper selection of the starting materials, catalysts, reaction temperatures, etc. Thus, in the case of the viscoresins produced from isobutylene by the use of a boron trifluoride catalyst as above described, it is a general rule that the lower the reaction temperature the harder the viscoresin produced. Also under given reaction conditions pure isobutylene gives a harder viscoresin than does a mixture of petroleum refinery gases containing isobutylene.

In some cases it will be found that a small amount of synthetic oil is made along with the viscoresin. This may, if desired, be removed from the resin by extraction with solvents such as propane, acetone-alcohol, or acetone-benzol, by vacuum distillation, etc. It is also possible by the use of these or other processes to fractionate viscoresins into relatively hard fractions and relatively soft fractions in order to produce viscoresins having the desired properties. However, in mose cases satisfactory compositions can be made without fractionating the viscoresin and without removing any synthetic oil made along with it.

Somewhat similar, but generally inferior, viscoresins can be produced by the hydrogenation of rubber since hydrogenated rubber is similar in chemical and physical properties to the polymerized resins previously mentioned. Hydrogenated synthetic rubber can also be used. Rubber itself, however, is inferior for the purpose of the present invention to the viscoresins which form the subject matter of this invention.

If the viscoresin produced is not entirely colorless and odorless it can be rendered so, if desired, by treatment, in light hydrocarbon solution or otherwise, with sulfuric acid, fuller's earth, or other treating agent as in the manufacture of refined petroleum oils. A dye or pigment can then be added if desired.

Compositions of matter for the purposes above described can be made from my viscoresins in a number of ways, depending upon the particular problem to be solved. Thus for example, I can produce a soft wax which can be applied and worked with the hands. Alternatively, I can produce a composition which is suitable for application with a brush. If desired, a hard wax which requires heating before application can also be made. Still another type of composition containing my viscoresins can be made by dissolving them in a volatile solvent and applying the solution by spraying or brushing.

In any event these various compositions all of which preferably contain at least 15% by weight of viscoresin (exclusive of any volatile solvent which may be used) are alike characterized by the advantages flowing from the fact that the viscoresins contained in them are completely inert biologically and are highly adhesive, highly flexible and highly plastic. At least some of these properties are imparted to a grafting wax even when large quantities of waxes, fats, oils, pitches etc. are used along with the viscoresin. The composition thus stays in place during growth of the tissues to which it is applied and is harmless to those tissues.

These viscoresins are also stable to light and air and do not harden on exposure. They are permanently plastic and prevent the cracking of the grafting wax or its separation from the tissues to which it is applied. They are insensitive to temperature and insoluble in water and are therefore unaffected by weather. Their high degree of adhesiveness serves to hold the grafting wax permanently to the joint between the scion and the stock. They can be applied at relatively low temperatures and the danger of injury to the scion due to overheating is thus avoided.

An example of soft grafting wax according to my invention is as follows:

Example 1

| | Parts |
|---|---|
| Viscoresin | 5 |
| Beeswax | 1 |
| Petrolatum wax | 2 |
| Mineral lubricating oil | 1 |

An example of a brushing wax in accordance with my invention is as follows:

Example 2

| | Parts |
|---|---|
| Soft viscoresin | 2 |
| Petrolatum wax | 5 |

An example of hard wax in accordance with my invention is as follows:

Example 3

| | Parts |
|---|---|
| Hard viscoresin | 4 |
| Beeswax | 2 |
| Tallow | 1 |

An example of a dissolved wax for spraying is as follows:

Example 4

| | Parts |
|---|---|
| Viscoresin | 2 |
| Beeswax or paraffin wax | 5 |
| Petroleum naphtha (solvent grade) | 5 |

Any of these compositions may contain suitable auxiliary materials such as lamp black, zinc oxide, etc. and they may also include insecticides and/or fungicides in solution or suspension. Materials of this sort which can be used include pyrethrum, derris, cubé extract, colloidal sulfur, copper carbonate, cresylic acid, formaldehyde, etc.

In many cases no other substances need be used with the viscoresin at all. Thus, some grades of viscoresin may be applied directly as a soft wax.

Harder grades may be used by dissolving them in a volatile solvent (along with an insecticide or fungicide if desired) and this may be applied by spraying or brushing. Thus for example, I have found that a satisfactory composition can be made by dissolving a viscoresin, such as that produced from isobutylene under the reaction conditions described above, in a hydrocarbon thinner, such as petroleum naphtha. A small amount of cresylic acid can suitably be added thereto.

While I have described my invention in connection with certain specific embodiments, it is to be understood that I am not limited thereby but only to the broadest valid scope of the appended claims.

I claim:

1. In the art of tree surgery, the step of applying an adhesive, flexible, plastic, synthetic hydrocarbon resin to the wound.

2. In the art of tree surgery, the step of sealing excoriated arboraceous tissues which comprises applying an adhesive, flexible, plastic, biologically inert, synthetic hydrocarbon resin to said tissues.

3. The art of sealing excoriated arboraceous tissues from the atmosphere which comprises applying to said tissues a polymerized hydrocarbon viscoresin.

4. The art of sealing excoriated arboraceous tissues from the atmosphere which comprises applying to said tissues a high molecular weight polymer of isobutylene.

5. The art of sealing the joint between a scion and a stock which comprises applying to said joint a synthetic saturated hydrocarbon viscoresin of high molecular weight.

6. A grafting wax comprising an adhesive, flexible, plastic, synthetic hydrocarbon resin.

7. A grafting wax comprising a polymerized hydrocarbon viscoresin.

8. A grafting wax according to claim 7 which also comprises a substance selected from the insecticides and the fungicides.

9. A grafting wax comprising a polymerized hydrocarbon viscoresin and petrolatum wax.

10. A grafting wax comprising a high molecular weight polymer of isobutylene.

11. A grafting wax comprising a high molecular weight polymer of isobutylene together with petrolatum wax.

HOWARD L. GERHART.

DISCLAIMER 2,051,840.—*Howard L. Gerhart*, Whiting, Ind. TREE SURGERY. Patent dated August 25, 1936. Disclaimer filed January 5, 1939, by the assignee, *Standard Oil Company (Indiana)*.

Hereby enters this disclaimer to, but only to, those claims in said specification which are numbered 1, 2, 3, and 4.

[*Official Gazette February 7, 1939.*]